United States Patent
Dillinger et al.

(10) Patent No.: US 6,810,023 B1
(45) Date of Patent: Oct. 26, 2004

(54) METHOD AND RADIO COMMUNICATIONS SYSTEM FOR TRANSMITTING INFORMATION BETWEEN A BASE STATION AND OTHER RADIO STATIONS

(75) Inventors: Markus Dillinger, München (DE); Jürgen Schindler, Berlin (DE); Jean-Michel Traynard, München (DE)

(73) Assignee: Siemens Aktiengesellschaft, Munich (DE)

( * ) Notice: Subject to any disclaimer, the term of this patent is extended or adjusted under 35 U.S.C. 154(b) by 762 days.

(21) Appl. No.: 09/648,940

(22) Filed: Aug. 25, 2000

(30) Foreign Application Priority Data

Feb. 27, 1998 (DE) .......................................... 198 08 371

(51) Int. Cl.[7] .................................................. H04B 1/44
(52) U.S. Cl. ........................................ 370/281; 370/278
(58) Field of Search ................................ 370/278, 282, 370/296, 507, 508, 342; 455/78, 79; 375/130, 131, 140, 141, 146

(56) References Cited

U.S. PATENT DOCUMENTS

| | | | | |
|---|---|---|---|---|
| 5,515,365 A | * | 5/1996 | Sumner et al. ............. | 370/278 |
| 5,533,015 A | * | 7/1996 | Makowski et al. ......... | 370/296 |
| 5,987,023 A | * | 11/1999 | Albrow et al. ............. | 370/350 |
| 6,016,311 A | * | 1/2000 | Gilbert et al. ............. | 370/280 |
| 6,111,860 A | * | 8/2000 | Braun ......................... | 370/276 |
| 6,339,612 B1 | * | 1/2002 | Stewart et al. ............. | 375/140 |

FOREIGN PATENT DOCUMENTS

| | | |
|---|---|---|
| DE | 196 29 899 C1 | 8/1997 |
| EP | 0 375 361 A2 | 6/1990 |
| EP | 0 615 352 A1 | 9/1994 |

OTHER PUBLICATIONS

"Capacity of a cellular time division duplex CDMA system" (Povey), dated Oct. 5, 1994, vol. 141, No. 5, IEE Proc. Commun., pp. 351–356;.

"TDD–CDMA Extension to FDD–CDMA Based Third Generation Cellular System" (Povey), dated Oct. 12, 1997, The University of Edinburgh, Kings Buildings , pp. 813—817, as mentioned on p. 1 of the specification.

* cited by examiner

*Primary Examiner*—Wellington Chin
*Assistant Examiner*—Mark A Mais
(74) *Attorney, Agent, or Firm*—Laurence A. Greenberg; Werner H. Stemer; Ralph E. Locher (57) ABSTRACT

Information is transmitted between a base station and other transceiver stations in a radio communication system within a common frequency channel in the downlink and uplink. At least one switching time is established in this case between the downlink and uplink. These bursts can be configured for the highest possible spectral efficiency in accordance with the rules of mobile radio telephony. However, a burst of shortened duration is transmitted before and/or after the switching time. In TDD transmission systems, this, therefore, prevents the receiving and transmitting operation from overlapping for the switching time due to disadvantageous relative signal propagation times.

13 Claims, 6 Drawing Sheets

PRIOR ART

METHOD AND RADIO COMMUNICATIONS SYSTEM FOR TRANSMITTING INFORMATION BETWEEN A BASE STATION AND OTHER RADIO STATIONS

CROSS-REFERENCE TO RELATED APPLICATION

This is a continuation of copending international application PCT/DE99/00285, filed Feb. 3, 1999, which designated the United States.

BACKGROUND OF THE INVENTION

FIELD OF THE INVENTION

Povey, Holma, and Toskala, in "TDD-CDMA Extension to FDD-CDMA Based Third Generation Cellular System," 1997 IEEE 6th Int'l Conf. on Universal Personal Communications Record, San Diego, Oct. 12–16, 1997, pages 813–17, describe a third-generation FDD-CDMA mobile radio system which has, within one transmission frame, an asymmetric transmission capacity in the uplink and in the downlink direction between a base station and a subscriber.

In radio communications systems, information (for example voice, picture information or other data) is transmitted with the aid of electromagnetic waves via a radio interface between a transmitting and a receiving radio station (base station and mobile station, respectively). The electromagnetic waves are thereby radiated at carrier frequencies which are located within the frequency band provided for the respective system. In the case of GSM (Global System for Mobile Communications), the carrier frequencies are in the range of 900, 1800 and 1900 MHz, respectively. For future mobile radio networks with CDMA or TD/CDMA transmission methods via the radio interface, for example the UMTS (Universal Mobile Telecommunication System) or other $3^{rd}$-generation systems, frequencies are provided within the frequency band of approx. 2000 MHz.

During their propagation in a propagation medium, signals are subject to interference due to noise. Signal components pass through different propagation paths due to diffraction and reflection and become superimposed at the receiver. Such a multi-path channel is described by a channel pulse response. In the case where there are a number of signal sources, these signals also become superimposed. To distinguish between the signal sources and thus to evaluate the signals, frequency-division multiple access (FDMA), time-division multiple access (TDMA), or a method known as code-division multiple access (CDMA) are used.

A special instance of the time-division multiple access (TDMA) is a time-division duplex (TDD) transmission method in which the transmission takes place in a common narrowband frequency channel both in the uplink direction (i.e., from the mobile station to the base station) and in the downlink direction (i.e., from the base station to the mobile station). Such a TDD transmission method is known from the DECT (digital enhanced cordless telephony) system. In the DECT system, one frame consists of 24 time slots, half of which are continuously used in each case for the uplink and the downlink, respectively.

Unlike mobile radio networks, the DECT system does not have an allocation of radio engineering resources by the network but the mobile stations look for their own frequency range and time slot in accordance with the transmission conditions. All bursts transmitted in both directions of transmission have a common length which is greatly shortened in comparison with the duration of a time slot so that the bursts can be easily separated at the receiving end even under adverse transmission conditions and for the time slots around the switching time between the uplink and downlink. However, the spectral efficiency is not very good since unused period of a time slot is lost for transmitting information.

SUMMARY OF THE INVENTION

It is accordingly an object of the invention to provide an improved method and an improved radio communication system for transmitting information which overcomes the above-mentioned disadvantages of the heretofore-known devices and methods of this general type, and in which the spectral efficiency is increased.

With the foregoing and other objects in view there is provided, in accordance with the invention, a method of transmitting information between a base station and other radio stations in a radio communications system, which comprises, within an individual transmission frame:

transmitting information with first bursts in a frequency channel in a downlink;

transmitting information with second bursts in the frequency channel in an uplink;

establishing at least one switching time between the uplink and the downlink;

transmitting a third burst of shortened duration compared with a duration of at least one of the first bursts and the second bursts adjacent the switching time within the transmission frame, i.e., before and/or after the switching time.

In other words, the information is transmitted by first bursts in a frequency channel in the downlink and by second bursts in the same frequency channel in the uplink. At least one switching time (instant) is established in this case between the downlink and uplink. These first and second bursts can be configured for the highest possible spectral efficiency in accordance with the rules of mobile radio telephony. However, a third burst of shortened duration compared with the first and second bursts is transmitted before and/or after the switching time. This prevents the receiving and transmitting operation from overlapping for the switching time due to disadvantageous relative signal propagation times. Thus, the data rate only needs to be reduced for one or two bursts per frame in comparison with the maximum data rate of the remaining bursts so that the achievable data rate, and thus the spectral efficiency, is improved overall.

In accordance with an added feature of the invention, the first, second, and third bursts are transmitted in time slots of uniform period. There is thus a fixed time-slot pattern which can be used by the base station and mobile stations for reference with respect to the transmitting times. With such a time-slot structure, it is important that the bursts arrive at the receiver, especially at the base station, in the correct time slot around the switching time. Thus, in particular, the switching time which brings about the switching from transmitting to receiving for the base station must be protected by the shortened third bursts. It is assumed that the mobile station is synchronized to the base station.

In accordance with an additional feature of the invention, a time difference between the duration of the first bursts and the third bursts is set to approximately a round-trip delay between the base station and the other radio station.

In accordance with another feature of the invention, a time difference between the duration of the first and second bursts and a duration of a time slot within the transmission frame substantially corresponds to a duration of a channel pulse response.

These adjustments result in the best possible utilization of a time slot so that high data rates can be achieved and, nevertheless, no collisions occur between transmitting and receiving operation even under disadvantageous transmission conditions.

In accordance with a further feature of the invention, the shortened third burst is transmitted approximately at the switching time from downlink to uplink.

For radio communication systems comprising radio cells of variable extent, the duration of the third burst is advantageously set to be inversely proportional to the radius of a radio cell of the base station. Thus, the loss of data rate is less for small radii than for large radii. This further increases the spectral efficiency particularly in radio communication systems comprising macrocells or hierarchical cell structures, respectively.

In accordance with again an added feature of the invention, the frame is formed of a number of bursts and the switching time is shiftable in either direction of transmission within a frame. This is especially advantageous because it provides for an asymmetric distribution of the data rate in the uplink and downlink in accordance with the instantaneous demand. For data transmission services, e.g. mobile World Wide Web browsers, the volume of information to be transmitted will frequently be greater in the downlink than in the uplink. This can be achieved by shifting the switching time to favor the downlink whilst retaining good spectral efficiency. If at a later time an increased data rate is again needed in the uplink, e.g. due to a voice transmission or due to large volumes of data to be transmitted in the uplink, which need a symmetric resource distribution or a resource distribution favoring the uplink, the switching time can be adapted to this.

The novel method is particularly advantageous to TDD systems in which the frequency channels have a wide bandwidth and a number of signals which can be distinguished by means of CDMA codes are simultaneously transmitted in one frequency channel.

In the case of broadband time slots, optimum utilization of the frequency channel along the time axis is of particular importance.

With the above and other objects in view there is also provided, in accordance with the invention, a radio communications system, comprising:

- a base station for transmitting information to at least one other radio station;
- a device for allocating radio engineering resources, and for defining a transmission of information, within one transmission frame, by first bursts in a frequency channel in a downlink and by second bursts in the same frequency channel in an uplink;
- a controller in one of the base station and the at least one other radio station, the controller being configured to establish at least one switching time between the downlink and uplink; and
  to set a third burst within the frame adjacent the switching time (i.e., before and/or after the switching instant), the third burst being shorter than at least one of the first and second bursts, and being transmitted within the same transmission frame as the first and second bursts.

Other features which are considered as characteristic for the invention are set forth in the appended claims.

Although the invention is illustrated and described herein as embodied in a method and radio communication system for transmitting information between a base station and other transceiver stations, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
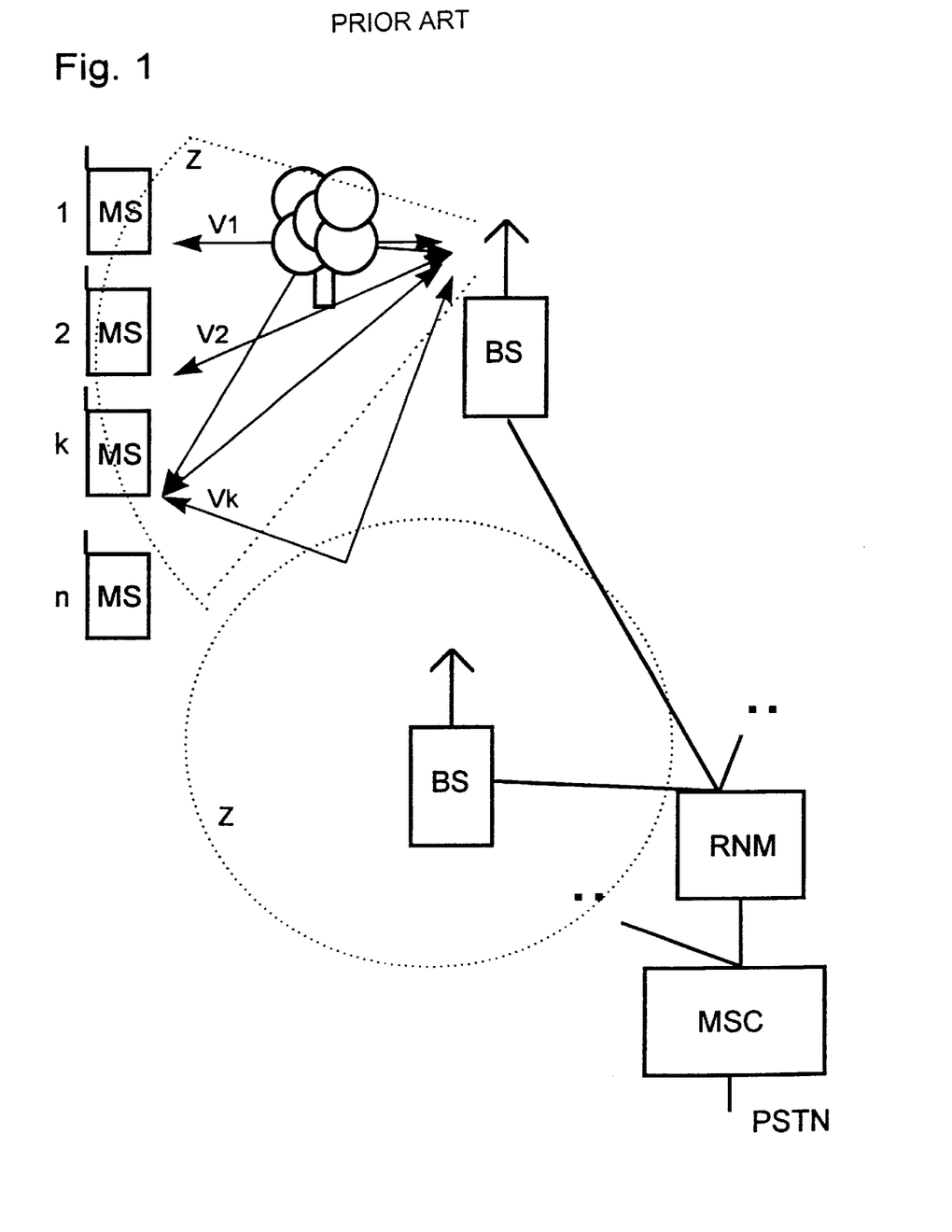
FIG. 1 is a block diagram of a mobile radio network.

Referring now to the figures of the drawing in detail and first, particularly, to FIG. 1 thereof, there is shown a radio communications system with a multiplicity of mobile switching centers MSC, which are networked together and establish the access to a line network PSTN. The mobile switching centers MSC are connected to in each case at least one device RNM for allocating radio engineering resources. Each of these devices RNM, in turn, provides for a connection to at least one base station BS. Such a base station BS can set up a connection to other transceiver stations, e.g. mobile stations MS or other mobile and stationary terminals via a wireless radio interface. Each base station BS forms at least one radio cell Z. In the case of sectorization or in the case of hierarchical cell structures, a number of radio cells Z are also covered for each base station BS.

FIG. 1 shows by way of example connections V1, V2, Vk for transmitting user information and signaling information between mobile stations MS1, MS2, MSk, MSn and a base station BS. An operations and maintenance center OMC implements control and maintenance functions for the mobile radio network or parts thereof, respectively. The functions of this structure can be transferred to other radio communication systems in which the invention can be used, especially for subscriber access networks with wireless subscriber access.

Figure 2:
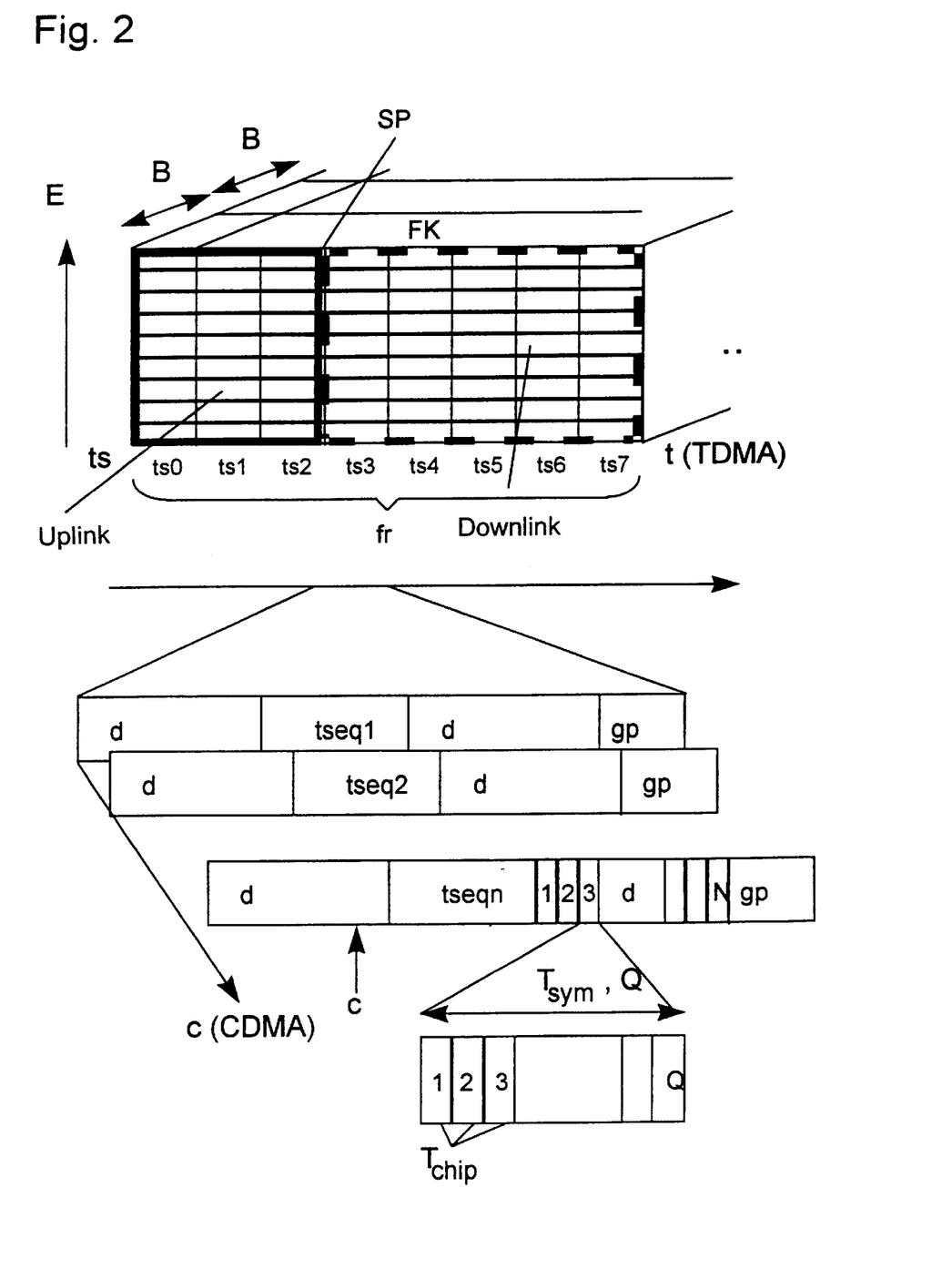
FIG. 2 is a diagrammatic representation of the frame structure of the TDD transmission method.

The frame structure of the radio transmission is illustrated in FIG. 2. In a TDMA component, a broadband frequency range, for example with a bandwidth B=1.2 MHz is divided into a number of time slots ts of identical period, for example 8 time slots ts0 to ts7. The frequency range B forms a frequency channel FK. Some of the time slots (ts0 to ts2) are used in the uplink and some of the time slots (ts3 to ts7) are used in the downlink. Between these, a switching time SP is located. The uplink transmission takes place, for example, before the downlink transmission. In this TDD transmission method, the frequency channel FK for the uplink corresponds to the frequency channel FK for the downlink. The same is repeated for other carrier frequencies.

Within the frequency channels FK, which are only provided for the transmission of user data, information of a number of connections is transmitted in bursts. These bursts for user data transmission consist of sections with data d in which sections with training sequences tseq1 to tseqn, which are known at the receiving end, are embedded. The data d are connection-individually spread by means of a fine structure, a subscriber code c, so that at the receiving end, for example, n connections can be separated by means of this CDMA component.

Spreading individual symbols of the data d has the effect that Q chips of duration $T_{chip}$ are transmitted within the symbol period $T_{sym}$. The Q chips form the connection-oriented subscriber code c. Furthermore, a guard period gp for compensating for different signal propagation times of the connections is provided within the time slot ts.

Within a broadband frequency range B, the successive time slots ts are structured in accordance with a frame structure. Thus, eight time slots ts are combined to form one frame fr, in which case, for example, a time slot ts3 is repetitively utilized by a group of connections. However, it is also possible to form frames having more than eight time slots, e.g. 16 or 32 time slots.

Figure 3:
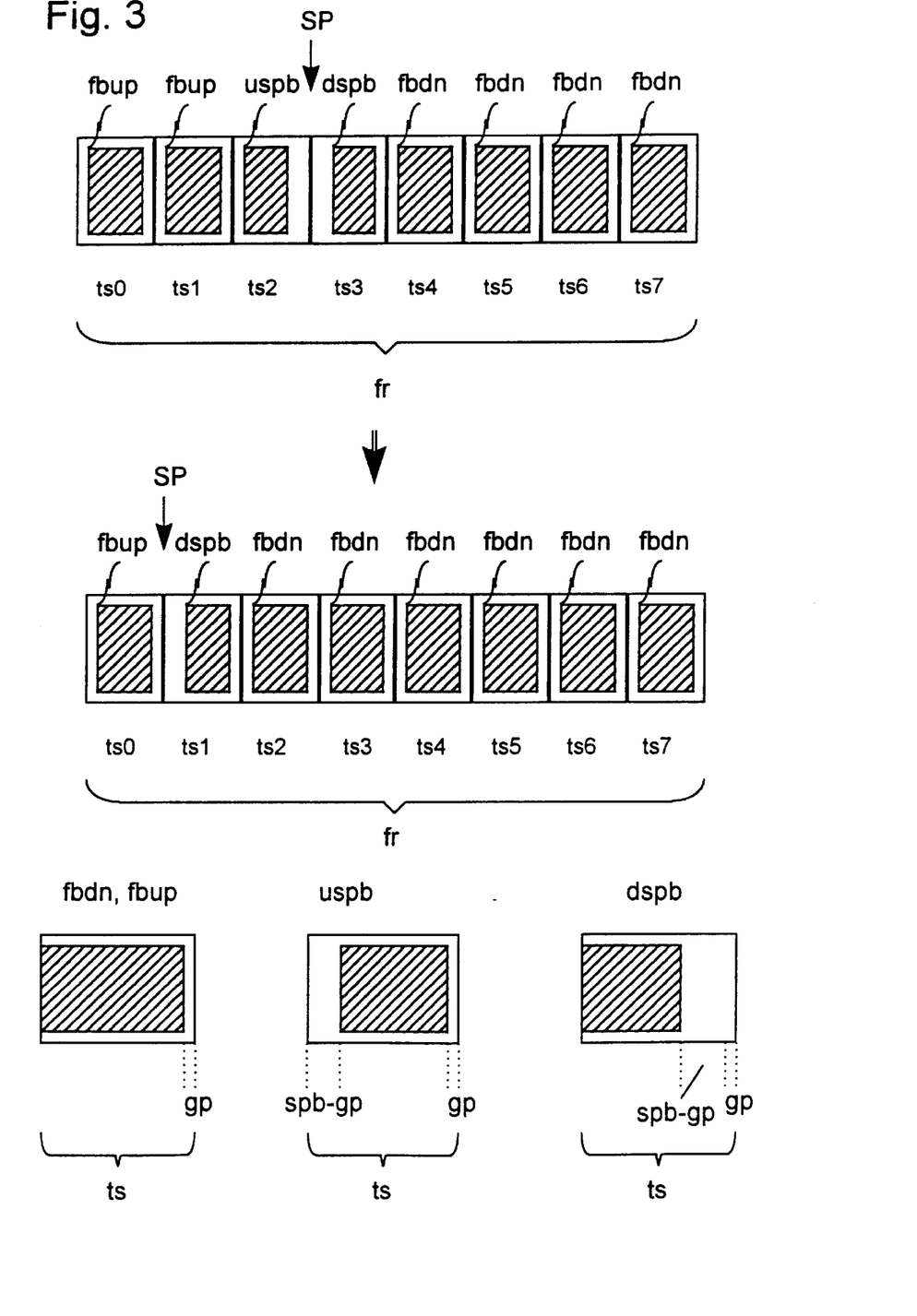
FIG. 3 are schematic diagrams showing the duration of the bursts within one frame.

Referring now to FIG. 3, there is shown a frame fr with eight time slots ts0 to ts7. Three time slots ts0 to ts2 are used in the uplink and five time slots ts3 to ts7 are used in the downlink as in FIG. 2. A switching time SP marks the transition between the directions of transmission within the frame fr.

For the uplink, first bursts fbup are used in the two time slots ts0 and ts1. For the downlink, second bursts fbdn are used in the time slots ts4 to ts7. These first and second bursts can be called "normal bursts" and are designed to provide high spectral efficiency. This means that only one guard period gp essentially adapted to the channel pulse response, i.e. corresponding to the multipath propagation within the radio cell, is provided. This guard period gp is the time difference between the duration of the first and second bursts fbup, fbdn and the duration of the time slots ts. The guard period gp is provided, for example, at the end of the time slot ts. As an alternative, however, it can be provided that the lengths of the first and second bursts fbup, fbdn differ.

For the time slots ts2 and ts3, which enclose the switching time SP, shortened third bursts uspb, dspb are provided. It should be noted that, as an alternative, it is possible to use only one shortened burst, either only in the uplink (in the slot ts2) or only in the downlink (in the slot ts3). A third burst uspb for the uplink provides an additional guard period spb-gp for the switching instant at the beginning of the time slot ts. In the downlink, this additional guard period spb-gp is located at the end of the time slot ts.

The additional guard period spb-gp essentially corresponds to the round-trip delay between base station BS and mobile station MS. If only information from one mobile station MS is transmitted in a time slot, the additional guard period spb-gp can be established on an individual basis. If the information from a number of mobile stations MS is transmitted in this time slot ts, the longest signal delay must be taken into consideration. If the additional guard period spb-gp is to be designed less flexibly in order to reduce the signaling complexity necessary for this, it is defined in accordance with the extent, i.e. the radius, of the radio cell Z of the base station BS. In the case of hierarchical cell structures, a number of levels of radio cells of different extent are located above one another so that longer guard periods spb-gp are used for so-called macrocells having a greater radius than for so-called microcells having a smaller radius.

An arithmetic example may be, for example, that the round-trip delay is approx. 33.3 µs for a distance of 5 km between the mobile station MS and the base station BS so that an additional guard period of at least 33.3 µs has to be provided.

FIG. 3 also shows that the switching time SP can be shifted within the frame fr. If the switching time SP is placed between the first and second time slot ts0, ts1, a greater transmission capacity is available in the downlink. The radio engineering resources can be optimally distributed in accordance with the instantaneous demand for transmission capacity.

Figure 4:
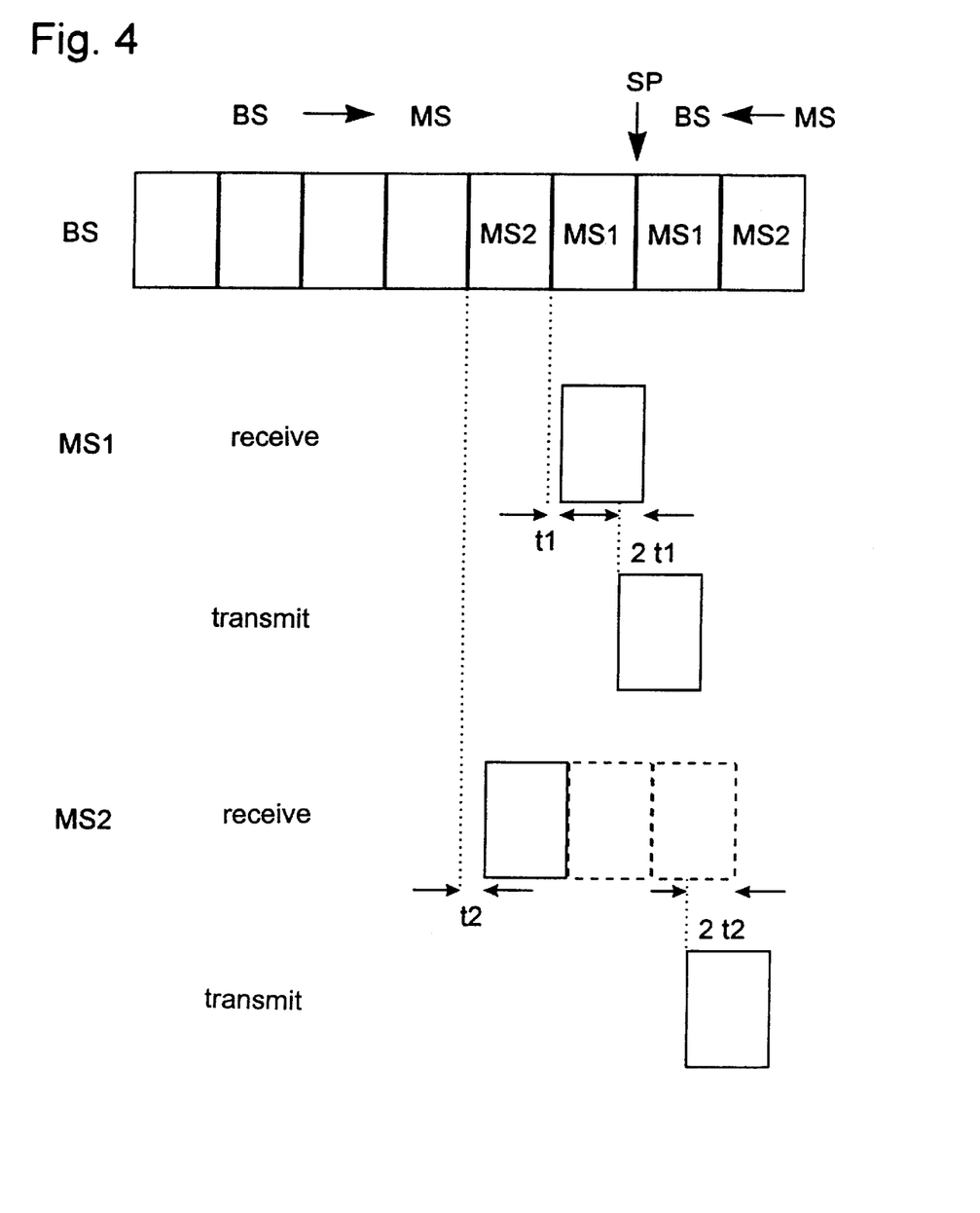
FIG. 4 is a schematic of the allocation of time slots to mobile stations.

The additional guard period spb-gp is calculated from the constellation according to FIG. 4. In contrast with FIGS. 2 and 3, it is assumed here that transmission takes place first in the downlink and then in the uplink within one frame. The time structure of the information transmission is derived from the time slots which are transmitted by the base station BS. The switching time SP is after the sixth time slot. In the downlink, information for a second mobile station MS2 is transmitted in the fifth time slot and information for a first mobile station MS1 is transmitted in the sixth time slot. For the uplink, the first mobile station MS1 transmits in the seventh time slot and the second mobile station MS2 transmits in the eighth time slot of the frame.

In the downlink, the bursts transmitted by the base station BS reach the mobile stations MS1, MS2 delayed by the respective signal propagation time t1, t2. The signal propagation time depends on the distance between base station BS and mobile station MS1, MS2. In the uplink, the bursts must be transmitted with a timing advance of 2 times t1, t2 in order to arrive in the correct time slot without time displacement at the base station BS. Otherwise, the transmitting and receiving operation would overlap at mobile station MS1 or base station BS. Without paying attention to the shortened bursts, the transmit signal of the base station BS would become superimposed on the transmit signal of the first mobile station MS1 in FIG. 4. If the maximum cell radius is not exceeded, the transmit signal of the second mobile station MS2 will not collide with the transmit signal of the first mobile station MS1.

Figure 5:
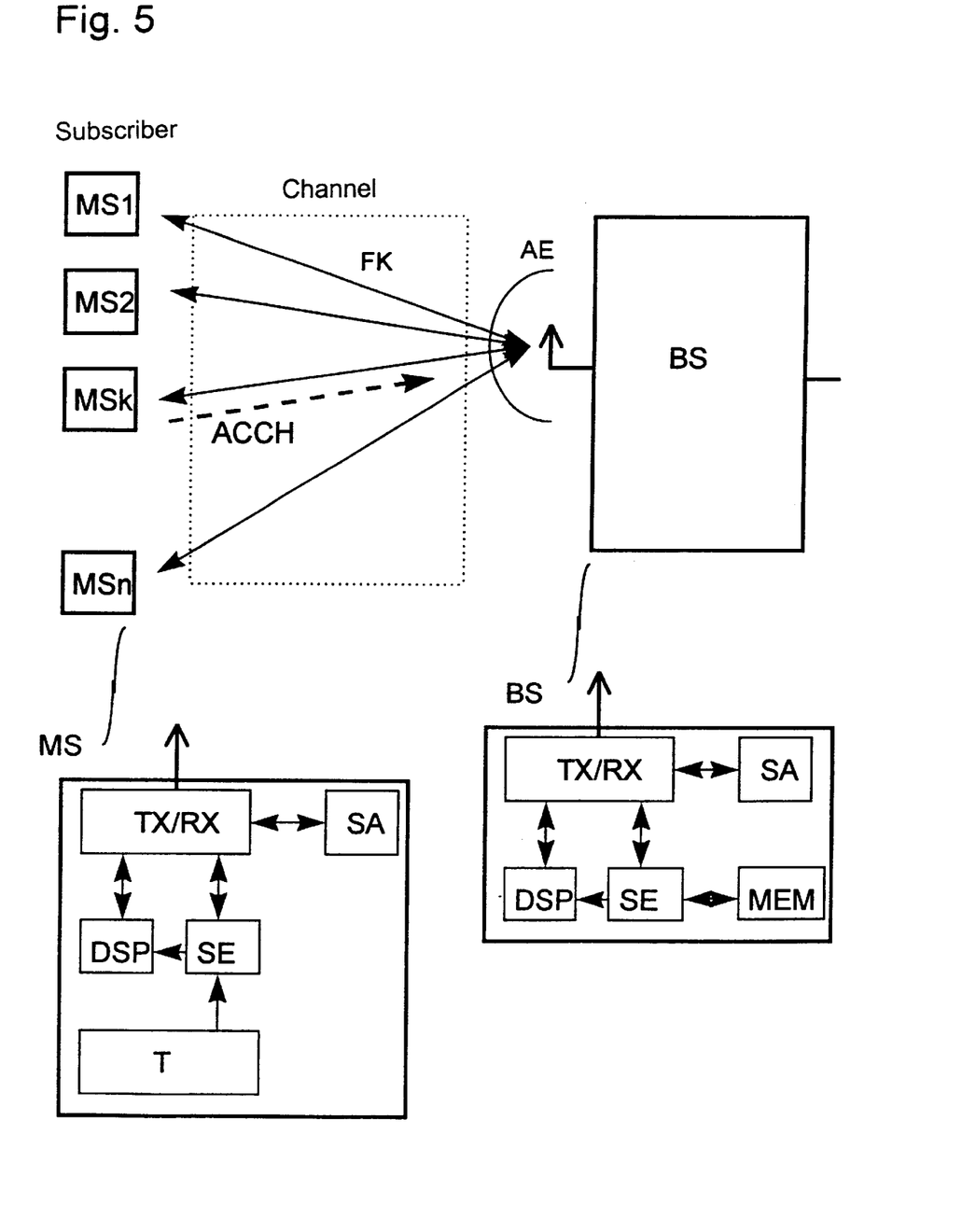
FIG. 5 is a block diagram of the base station and mobile station.

Referring now to FIG. 5, there is illustrated the transmission of information from the base station BS to mobile stations MS1 to MSn.

The mobile stations MS1 to MSn first determine one or more frequency ranges with a sufficiently high or maximum received power. These are the frequency ranges of the nearest base station BS in the cell of which the mobile station MS is currently located. This produces the association between the base station BS and the mobile station MS.

The base station BS contains a transceiver device TX/RX which digital/analog-converts the transmit signals to be radiated, converts them from baseband into the frequency range of radiation and modulates and amplifies the transmit signals. A signal generating device SA has previously assembled the transmit signals into bursts and allocated them to the corresponding frequency channel and time slot. A signal processing device DSP evaluates received signals received via the transceiver device TX/RX and performs channel estimation.

The received signals are converted, for example digitized, into symbols with a set of discrete values for the purpose of signal processing. A signal processing device DSP, which, as digital signal processor, contains a JD (joint detection) processor for detecting the user information and the signaling information in accordance with the JD-CDMA method, evaluates the data parts d. The interaction between the components and the setting of the switching time SP is controlled by a controller SE of the base station BS. Associated data concerning the switching time SP and the actual situations of the connection are stored in a memory device MEM.

The mobile station MS contains the assemblies explained for the base station BS in corresponding adaptation and, in addition, an operating panel T. At the operating panel T, the subscriber can effect inputs, among others an input for activating the mobile station MS or for setting up a connection to the base station BS. The controller SE evaluates signals transmitted in the downlink and received by the mobile station MS, determines the received power and, respectively, the instantaneous signal/noise ratio present and initiates signaling to the base station BS in a signaling channel ACCH, whereupon a frequency channel FK and a time slot ts are allocated for user data transmission.

The switching time SP between the downlink and uplink is established by the controller SE of the base station. The controller SE of the station transmitting in each case, i.e. the mobile station MS for the uplink and the base station BS for the downlink, is used for setting the length of the third burst dspb, uspb before and after the switching time SP.

Figure 6:
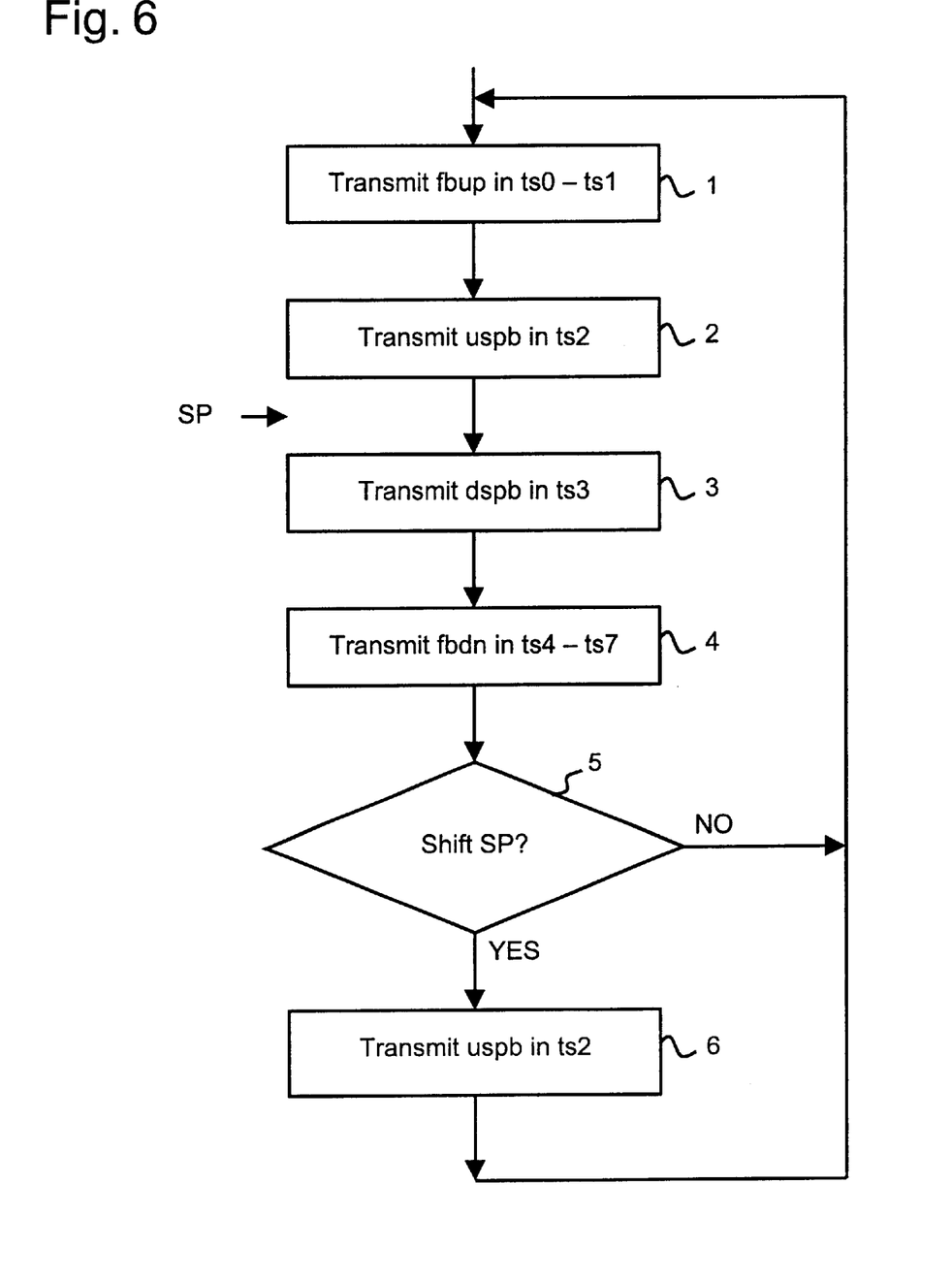
FIG. 6 is a flowchart illustrating the transmission of information.

FIG. 6 shows the sequence of information transmission in a greatly simplified manner. In a first step, the transmission of the first bursts fbup takes place in time slots ts0 to ts1 of a frequency channel FK, referring to FIG. 3. In a second step, a shortened third burst uspb is transmitted in time slot ts2 in the uplink. After the subsequent switching time SP, the base station BS transmits in the frequency channel FK already used previously. In a third step, a shortened third burst dspb is transmitted in time slot ts3 whereupon second bursts fbdn are transmitted in time slots ts4 to ts7 in a fourth step.

In a fifth step after the end of the frame fr, an interrogation whether the switching time SP is to be shifted is performed which relates to the demand for transmission capacity in both directions of transmission.

If the answer is yes, the new switching time SP is established in a sixth step so that the shortened burst and/or bursts dspb, uspb is/are transmitted in other time slots. In FIG. 3, the shift is to ts0, ts1 in the subsequent frame fr.

We claim:

1. A method of transmitting information between a base station and other radio stations in a radio communications system, which comprises, within an individual transmission frame:

transmitting information with first bursts in a frequency channel in a downlink;

transmitting information with second bursts in the frequency channel in an uplink;

establishing at least one switching time between the uplink and the downlink;

transmitting a third burst of shortened duration compared with a duration of at least one of the first bursts and the second bursts adjacent the switching time within the transmission frame.

2. The method according to claim 1, which comprises timing the third burst selectively to be placed before, after, or before and after the switching time within the transmission frame.

3. The method according to claim 1, wherein the transmitting steps comprise transmitting the first, second, and third bursts in time slots of uniform period.

4. The method according to claim 1, which comprises adjusting a time difference between the duration of the first bursts and the third bursts to approximately a round-trip delay between the base station and a respectively other radio station.

5. The method according to claim 3, wherein a time difference between a duration of a time slot within the transmission frame and the duration of at least one of the first bursts and the second bursts substantially corresponds to a duration of a channel pulse response.

6. The method according to claim 1, which comprises transmitting the shortened third burst approximately at the switching time from downlink to uplink.

7. The method according to claim 1, which comprises setting the duration of the third burst to be inversely proportional to a radius of a radio cell of the base station.

8. The method according to claim 1, wherein the frame is formed of a number of bursts and the switching time is shiftable in either direction of transmission within a frame.

9. The method according to claim 1, wherein the frequency channel has a wide bandwidth and the method further comprises simultaneously transmitting a number of signals which can be distinguished by CDMA codes in the frequency channel.

10. A radio communications system, comprising:

a base station for transmitting information to at least one other radio station;

a device for allocating radio engineering resources, and for defining a transmission of information, within one transmission frame, by first bursts in a frequency channel in a downlink and by second bursts in the same frequency channel in an uplink;

a controller in one of said base station and said at least one other radio station, said controller being configured to establish at least one switching time between the downlink and uplink; and to set a third burst within the frame adjacent the switching time, the third burst being shorter than at least one of the first and second bursts, and being transmitted within the same transmission frame as the first and second bursts.

11. The system according to claim 10, wherein said controller is configured to set the third burst before and after the switching time.

12. The system according to claim 10, wherein said controller is configured to set the third burst before the switching time.

13. The system according to claim 10, wherein said controller is configured to set the third burst after the switching time.

* * * * *

UNITED STATES PATENT AND TRADEMARK OFFICE
CERTIFICATE OF CORRECTION

PATENT NO.    : 6,810,023 B1
DATED         : October 26, 2004
INVENTOR(S)   : Markus Dillinger et al.

It is certified that error appears in the above-identified patent and that said Letters Patent is hereby corrected as shown below:

Title page,
Item [63], Related U.S. Application Data, should read as follows:
-- Continuation of application No. PCT/DE99/00285, filed on Feb. 3, 1999 --

Signed and Sealed this

Twenty-eighth Day of December, 2004

JON W. DUDAS
*Director of the United States Patent and Trademark Office*